June 18, 1968  K. W. EGGLER ET AL  3,388,884
MUD FLAP HOLDER
Filed Oct. 10, 1966
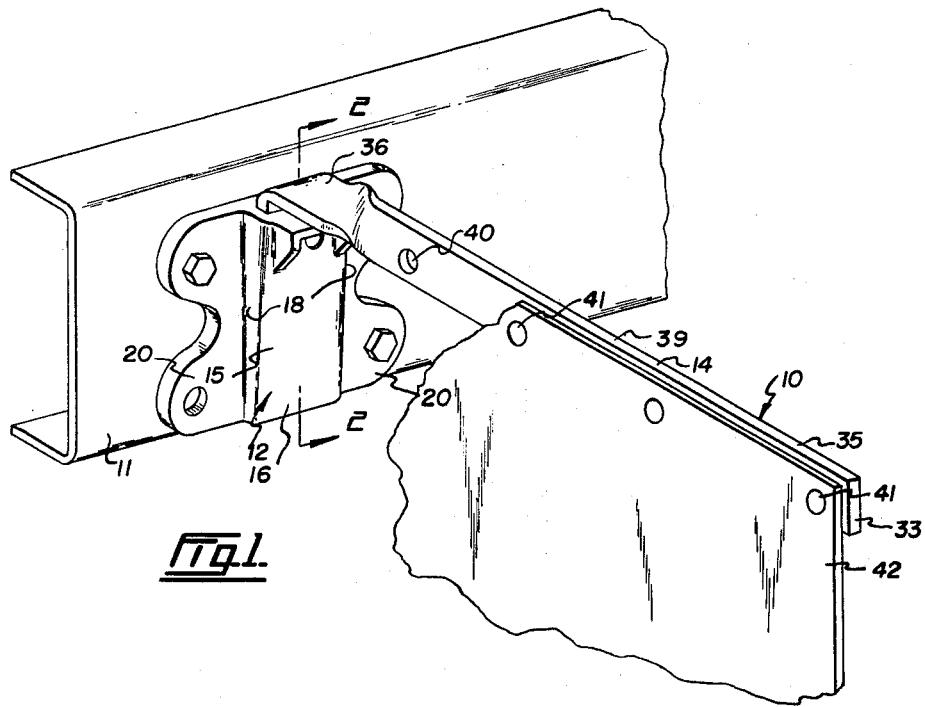
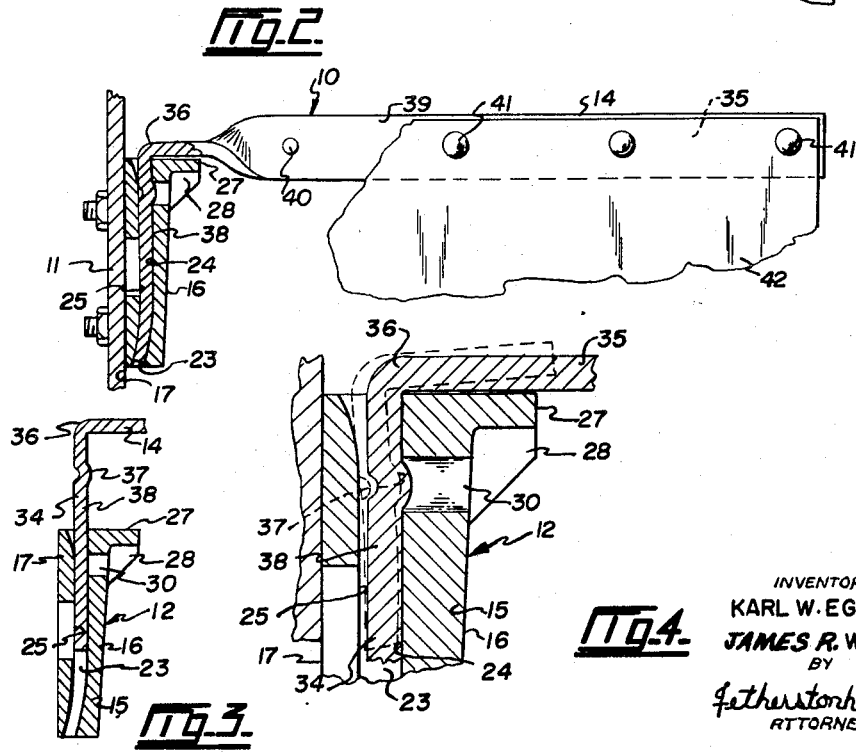
INVENTORS
KARL W. EGGLER
JAMES R. WADDELL
BY
Featherstonhaugh & Co.
ATTORNEYS

United States Patent Office 3,388,884
Patented June 18, 1968

3,388,884
MUD FLAP HOLDER
Karl W. Eggler, 8362 East Blvd., Vancouver, British Columbia, Canada, and James R. Waddell, 2435 Deerlake Drive, Burnaby, British Columbia, Canada
Filed Oct. 10, 1966, Ser. No. 585,668
4 Claims. (Cl. 248—224)

ABSTRACT OF THE DISCLOSURE

A mud flap holder in which a mud flap is attached to a supporting frame having a vertical leg adapted to slidably fit in an upwardly opening socket formed in a bracket attached to a vehicle frame. The socket is bent inwardly at its lower end to bend the leg out of its normal state of repose and force the latter against one side of the socket thereby resulting in the insertion of a projection on the leg into an opening formed in the bracket.

---

This invention relates to mud flap holders and more particularly to a mud flap holder which is of a resilient nature.

Mud flaps are normally mounted on the frame of a vehicle, particularly vehicles such as trucks and the like, directly behind the wheels thereof so as to serve as a shield to prevent stones, mud and the like from flying up into the air behind the travelling vehicle. These mud flaps have normally been permanently fixed to the frame. However, it is to be appreciated that there are certain mud flap holders of prior design which are so constructed as to be removably detached to the vehicle and which are of resilient nature so as to minimize possible damage due to being struck by obstructions and the like. These mud flap holders, however, have normally been relatively costly to manufacture and are not easily mounted to or detached from the vehicle without the use of wrenches and tools of special design.

The present invention provides a mud flap holder of this last mentioned type which is of simple yet strong construction, which is easily and cheaply manufactured and which may be mounted upon or detached from the vehicle without the use of any special tools.

The mud flap holder of the present invention furthermore, although being easy to apply and remove, is so designed as to render it, for all practical and intensed purposes, proof against normal forces which might tend to cause accidental disengagement therewith with the vehicle.

The present invention comprises a flap supporting element formed of a pair of elongated flat springy leg members rigidly connected to each other in end to end relationship and lying in planar substantially right angles to one another, a hollow bracket member connectable to the vehicle frame having spaced side and end walls forming an elongated upwardly opening socket for slidably receiving and supporting one of the leg members in a vertical position with the other leg member extending horizontally over one of the side walls, said side walls being gently curved downwardly out of the plane of said one leg member in a direction towards the other side wall so as to cause longitudinal deformation of said one leg member when the latter is fully inserted in the socket, and interlocking means formed adjacent the upper end of said one side wall and at the upper end of said one leg arranged for releasable locking element when said one leg is fully inserted in the socket, said side walls diverging upwardly to permit the upper end of said one leg, when fully inserted in the socket, to be flexed away from said one side wall so as to permit disengagement of the interlocking means.

Referring to the drawings which illustrate the invention,
FIGURE 1 is an isometric view of the invention as applied to the frame of a vehicle,
FIGURE 2 is an elevation partially in section of the invention showing it in its applied position,
FIGURE 3 is a sectional view of a portion of the invention illustrating duration of the parts thereof in a partially connected position, and
FIGURE 4 is an enlarged sectional view of a portion of the invention shown in applied operative position in solid lines, and in applied position ready for detachment from the vehicle in dotted lines.

Referring to the drawings, the mud flap holder here generally accorded the numeral 10 is shown applied to a frame member of a truck body. The holder 10 is formed generally of two parts, a bracket 12 which is permanently fixed to the frame 11, and a flap supporting element 14 which may be releasably engaged with the bracket.

The bracket 12 is formed having a vertically elongated hollow central section 15 of elongated rectangular cross sectional configuration having an outer side wall 16, an inner side wall 17 and end walls 18. Extending from the inner side wall on either side thereof are wing flanges 20 through which rivets or bolts and the like may be extended, whereby the bracket may be secured to the frame 11. This central portion 15 opens upwardly at its upper end to form a socket 23.

The inner surface 24 of the outer side wall for approximately the upper two-thirds of the length of the socket extends in a vertical plane, the lower one-third thereof being curved slightly out of the vertical plane in the direction of the inner wall 17. The inner surface 25 of the inner wall follows in spaced relationship, the curvature of the lower curved portion of said inner surface of said outer wall gradually diverges away from the outer wall, the socket 23 thereby diverging slightly in an upward direction.

There is formed extending outwardly of the upper end 27 of the outer wall, a supporting rib 28 having an upper surface lying flush with said upper end 27.

A circular aperture 30 is also formed through the outer wall 16 being located on the latter center line and the line below the supporting rib 28.

It is important that the bracket 12 be of relatively heavy construction to withstand rough usage. It is preferable, therefore, that it be cast as an integral unit, and of a material such as iron or aluminum.

The flap supporting element 14 is formed of a rectangular shaped bar of considerable length, said bar preferably being formed of spring steel. This bar is bent at right angles adjacent one end 33 to form a short leg 34 and a long leg 35, the length of the short leg 34 being substantially the same as that of the socket 23, and its thickness being substantially the width of the socket taken between the inner surfaces of the outer and inner side walls of the bracket.

Adjacent the upper end 36 of the short leg and on the latter's longitudinal center line, there is formed a hemispherically shaped raised projection 37 which, when the leg 34 is fully inserted in the socket 23, will lie in registry with the aperture 30.

The long leg 35 of the supporting element 14 is twisted close to its juncture with short leg 34 about its longitudinal axis so as to form a short section 35 extending in a horizontal plane and an elongated section 39 extending in a vertical plane, said elongated section 39 being provided with a plurality of rivets or screw holes 40 through which rivets or screws 41 may be passed to secure a flap 42, the latter being formed of a sheet of heavy flexible material, such as rubber.

In fitting the flap supporting element to the bracket 12, it is only necessary to insert the free end of the short leg 34 into the upper end of the socket 23 as shown in FIGURE 3, and then with the use of a hammer or some other heavy instrument drive said short leg until it is fully inserted as shown in FIGURES 2 and 4 of the drawings. As will be noted, the socket curves at its lower end towards the inner wall 17. This will therefore result in deformation of the lower end of the short leg which will consequently force the latter against the inner surface 24 of the outer side wall. The projections 37 will of course extend into the aperture 30 and will therefore serve to restrain any longitudinal movement of the short leg relative to the bracket.

The tight fit of the short leg with the bracket 12 will serve to restrain any relative movement thereof due to vibration forces, and the weight of the flap will maintain the short leg against the inner surface of the outer wall. At the same time, the supporting member 28 which lies underneath and engages the short section 38 of the leg 35 will prevent sagging of said long leg 35 from a horizontal position.

In order to detach the flap supporting element 14 of the bracket, it is only necessary to force the long leg 35 upwardly thereby bending the short leg 34 away from the inner surface of the outer wall 24, as shown in dotted lines in FIGURE 4. This will serve to draw the projection 37 out of the aperture 30 and, with the use of a hammer or similar heavy tool, the long leg 35 may be tapped against its juncture with the short leg 34 so as to loosen the latter within the socket 23, and the element 14 simply moved upwardly and outwardly thereof.

The wedging action of the short leg 34 within the socket 23, together with the positive interlock afforded by projection of the projection 37 into the aperture 30 will prevent relative movement of the connected parts of the holder under heavy usage. The parts, consequently, will not wear into one another as is common with mud flap holders of prior design.

It will also be appreciated that the holder of the present invention may be fabricated at very little cost, yet it provides a very strong stable structure having fore and aft as well as vertical resiliency. Furthermore, only one tool, such as a hammer, is required for either attaching or detaching the flap supporting elements 14 and even this may be dispensed with as a large rock could be used.

What we claim as our invention is:

1. Mud flap apparatus for attachment to a wheeled vehicle, the latter having a frame comprising a flap supporting element formed of a pair of elongated flat springy leg members rigidly connected to each other in end to end relationship and lying in planes substantially at right angles to one another, a hollow bracket member connectable to the vehicle frame having spaced side and end walls forming an elongated upwardly opening socket for slidably receiving and supporting one of the leg members in a vertical position with the other leg member extending horizontally over one of the side walls, said side walls being gently curved downwardly out of the plane of said one leg member in a direction towards the other side wall so as to cause longitudinal deformation of said one leg member when the latter is fully inserted in the socket, and interlocking means formed adjacent the upper end of said one side wall and the upper end of said one leg arranged for releasable locking engagement when said one leg is fully inserted in the socket, said side walls diverging upwardly to permit the upper end of said one leg, when fully inserted in the socket, to be flexed away from said one side wall so as to permit disengagement of the interlocking means.

2. Mud flap apparatus as claimed in claim 1 wherein the interlocking means comprises a projection formed on the one leg member, and a seat formed in the adjacent surface of said one side wall for receiving the projection when the said one leg is fully inserted into the socket.

3. Mud flap apparatus as claimed in claim 1 including a supporting piece extending outwardly of said one side wall beneath the other leg member for supporting the latter in a substantially horizontal position.

4. Mud flap apparatus as claimed in claim 1 wherein said other leg is twisted about its longitudinal axis at a point spaced from but close to its juncture with said one leg so as to lie in a plane substantially normal to its general plane.

References Cited

UNITED STATES PATENTS

| | | | |
|---|---|---|---|
| 716,713 | 12/1902 | Hughes | 248—225 XR |
| 1,176,137 | 3/1916 | Ette | 248—224 |
| 2,865,655 | 12/1958 | Boysen | 280—154.5 |

ROY D. FRAZIER, *Primary Examiner.*

J. F. FOSS, *Assistant Examiner.*